(12) United States Patent
Bakajin et al.

(10) Patent No.: US 7,290,667 B1
(45) Date of Patent: Nov. 6, 2007

(54) MICROFLUIDIC SIEVE USING INTERTWINED, FREE-STANDING CARBON NANOTUBE MESH AS ACTIVE MEDIUM

(75) Inventors: Olgica Bakajin, San Leandro, CA (US); Aleksandr Noy, Belmont, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/613,960

(22) Filed: Jul. 3, 2003

Related U.S. Application Data (60) Provisional application No. 60/393,425, filed on Jul. 3, 2002.

(51) Int. Cl.
*B01D 24/10* (2006.01)
*B01D 39/00* (2006.01)
*B01D 24/00* (2006.01)

(52) U.S. Cl. .............. 210/503; 210/502.1; 210/500.22; 210/500.23; 427/249.2; 427/249.3; 977/742; 977/745

(58) Field of Classification Search ................ 210/503, 210/502.1, 500.22, 500.23; 427/249.2, 249.3, 427/248.1, 450, 451; 204/403.1, 403.06; 977/DIG. 1
See application file for complete search history.

(56) References Cited

U.S. PATENT DOCUMENTS

| | | | |
|---|---|---|---|
| 6,110,247 A | 8/2000 | Birmingham et al. | |
| 6,203,814 B1 | 3/2001 | Fisher et al. | |
| 6,359,288 B1 | 3/2002 | Ying et al. | |
| 6,685,810 B2 * | 2/2004 | Noca et al. | 204/450 |
| 2004/0149209 A1 * | 8/2004 | Dai et al. | 118/715 |

FOREIGN PATENT DOCUMENTS

| | | |
|---|---|---|
| WO | WO 97/38312 | 10/1997 |
| WO | WO 01/63273 A2 | 8/2001 |
| WO | WO 02/49762 A2 | 6/2002 |

OTHER PUBLICATIONS

Benjamin Messer et al, Microchannel Networks for Nanowire Patterning, J. Am. Chem. Soc. 2000/22, 10232-10333.
X.Y. Zhang et al, Template synthesis of High-Density Carbon Nanotube Arrays, Journal of Crystal Growth 233 (2001) 306-310.
Jian Chen et al, Room-Temperature Assembly of Directional Carbon Nanotube Strings, J. Am. Chem. Soc. vol. 124; No. 5 2002 pp. 758-759.
Y.C. Sui et al, Synthesis of Multi Branched Carbon Nanotubes in Porous Anodic Aluminim Oxide Template, Carbon 39 (2001) 1709-1715.

(Continued)

*Primary Examiner*—Krishnan S. Menon
(74) *Attorney, Agent, or Firm*—James S. Tak; John H. Lee (57) ABSTRACT

A microfluidic sieve having a substrate with a microfluidic channel, and a carbon nanotube mesh. The carbon nanotube mesh is formed from a plurality of intertwined free-standing carbon nanotubes which are fixedly attached within the channel for separating, concentrating, and/or filtering molecules flowed through the channel. In one embodiment, the microfluidic sieve is fabricated by providing a substrate having a microfluidic channel, and growing the intertwined free-standing carbon nanotubes from within the channel to produce the carbon nanotube mesh attached within the channel.

10 Claims, 8 Drawing Sheets

OTHER PUBLICATIONS

Jian Chen et al, Room-Temperature Assembly of Directional Carbon Nanotube Strings, JACS Communications Jan. 11, 2002.

Takashi, Kyotani et al, Synthesis of carbon nanotube composites in nanochannels of an anodic aluminum oxide film, Inst. Chem. Reaction Sci., Tohaku University, Japan Bulletin of the Chem. Soc. Of Japan (1999) 72,(9), 1957-1970.

Takashi, Kyotani, Preparation of Ultrafine Carbon Tubes in Nanochannels of an Anodic Aluminum Oxide Film, Chem. Mater., 1996, 8, 2109-2113.

J.Li, C. Papadopoulos et al, Highly-ordered Nanotube Arrays for Electronics applications, Applied Physics Letters vol. 75 No. 3 Jul. 19, 1999.

* cited by examiner

MICROFLUIDIC SIEVE USING INTERTWINED, FREE-STANDING CARBON NANOTUBE MESH AS ACTIVE MEDIUM

CLAIM OF PRIORITY IN PROVISIONAL APPLICATION

This application claims priority in provisional application filed on Jul. 3, 2002, entitled "Microfabricated Channel with Patterned Carbon Nanotube Array Active Element and a Fabrication Strategy for such Device" Ser. No. 60/393,425, by inventors Bakajin et al.

The United States Government has rights in this invention pursuant to Contract No. W-7405-ENG-48 between the United States Department of Energy and the University of California for the operation of Lawrence Livermore National Laboratory.

FIELD OF THE INVENTION

The present invention relates to molecular and chromatographic separation mediums, and more particularly to a microfluidic sieve utilizing an intertwined free-standing carbon nanotube mesh as an active medium in a microfluidic channel for separating, concentrating, and/or filtering molecules flowed therethrough.

BACKGROUND OF THE INVENTION

Microfabricated fluidic systems are also being developed which employ nano-scale arrays comprising carbon nanotubes or other nanofeatures for use as separation matrices. One such example, utilizes nano-scale arrays of silicon pillars as separation matrices. However, the lithographic process at the nano-scale has been extremely difficult in the past. Other complications found in other on-chip separation device developments include, for example, the packing of columns with silica beads, which can complicate the fabrication process and drive up cost. Even highly efficient microfabricated devices such as those used for gas separation, still require that their columns be packed with carbon. If the packing process could be avoided, the microfabricated devices can be made more complex and more integrated.

One example which avoids the packing process is disclosed in the PCT publication number WO 01/63273 A2 to Noca et al, describing a molecular sieve employing self-assembled nano-arrays to separate molecules by differential transport therethrough via electrophoresis. The nano-arrays are fabricated using a template having germination points from which the nano-arrays are grown. As shown in the drawings, however, the template produces nano-features of uniform straightness and length which all have the same or similar orientations not intertwined or entangled with respect to each other. The "pores" in the Noca publication, therefore, are effectively defined by the spacing of the nano-features. While the Noca separation device is utilized to separate DNA strands traveling at different velocities through the device, the pore construction would be unable to also perform concentration or filtration functions effectively due to its large vertical pores that span the depth of the channel.

SUMMARY OF THE INVENTION

One aspect of the present invention includes a microfluidic sieve comprising: a substrate having a microfluidic channel; and a carbon nanotube mesh comprising a plurality of intertwined free-standing carbon nanotubes fixedly attached within said channel for separating, concentrating, and/or filtering molecules flowed therethrough.

Another aspect of the present invention includes a method of fabricating a microfluidic sieve, comprising: providing a substrate having a microfluidic channel; and growing a plurality of intertwined free-standing carbon nanotubes in said channel to produce a carbon nanotube mesh fixedly attached therein and capable of separating, concentrating, and/or filtering molecules flowed therethrough.

And another aspect of the present invention includes a method of separating, concentrating, and/or filtering molecules comprising: flowing said molecules through a microfluidic channel having a carbon nanotube mesh comprising a plurality of intertwined free-standing carbon nanotubes fixedly attached within said channel, whereby said carbon nanotube mesh operates as an active medium for separating, concentrating, and/or filtering said molecules.

BRIEF DESCRIPTION OF THE DRAWINGS

The accompanying drawings, which are incorporated into and form a part of the disclosure, are as follows.

DETAILED DESCRIPTION

The present invention is directed to a microfluidic sieve utilizing a mesh of intertwined free-standing carbon nanotubes grown within a microfluidic channel of a substrate to provide any one or more or all of separation, concentration, and/or filtering functions with respect to molecules and analytes present in a fluid flow (i.e. gas or liquid flow). The unique properties of carbon nanotubes, such as its small, tunable dimensions, e.g. pore size, a large surface-to-volume ratio (greater than packed bead columns), modifiable surface properties, etc., provide many advantages when used with microfluidic sieves for separation and concentration functions in various chromatographic applications. The present invention utilizes these unique properties of carbon nanotubes by growing a plurality of intertwined free-standing carbon nanotubes to attach within a microfluidic channel which is subsequently sealed. The mesh may be grown to completely fill a segment of the channel, i.e. its cross-section is filled, or grown to surface-coat a segment of the channel without completely filling the segment, so as to produce a gap through the segment.

It is notable that separation, concentration, and filtration operations are related if not similar operations involving the discrimination and/or selection of molecules based on a molecular property or properties, such as structural properties of size, weight, etc., chemical properties, e.g. hydrophilic, hydrophobic, etc., and even electrical properties having positive or negative charge. It is appreciated, however, that concentration and filtration further suggest that particles, i.e. molecules, are selectively retained after being separated. In this regard, and depending on the application, the microfluidic sieve of the present invention may actively operate to achieve any one or more or all of these functions, without being limited to any one.

While various fabrication methods may be employed for fabricating the microfluidic sieve of the present invention, the preferred fabrication method of the present invention uses chemical vapor deposition (CVD) employing a CVD growth catalyst. And preferably the catalyst for use in a CVD growth process nanotube growth is metallic iron (Fe). Applicants have been able to demonstrate that iron colloids supported on alumina nanoparticles, iron colloids alone, and thin layers of iron all lead to sufficient nanotube growth. In all cases, a high-temperature CVD reactor is utilized to effect pyrolysis of a reactant mixture, with the carbon nanotubes being grown by passing the hydrocarbon pyrolysis products over the iron catalyst. For a thin film iron layer of about 5 nanometers, a mixture of ethylene, hydrogen, and argon may be pyrolyzed at about 800-850 degrees Celsius. After growing the carbon nanotube mesh, the microfluidic channel may be sealably enclosed and capped with a cover, such as a glass cover slip, to contain and pack the mesh therein. The surfaces of the nanotube mesh may also be functionalized to select/discriminate molecules as required by the application.

Figure 1A:
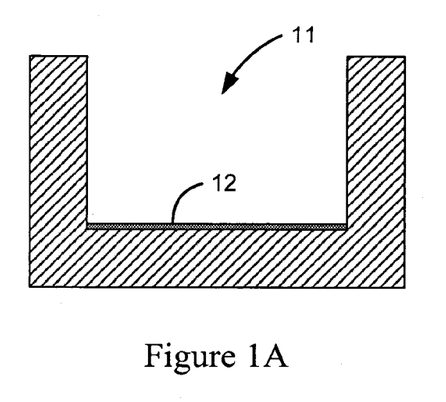
FIG. 1A is a schematic cross-sectional view of a first exemplary embodiment of the present invention illustrating the deposition of a catalyst in a microfluidic channel.

Turning now to the drawings, FIGS. 1A-D show the fabrication of a first embodiment of the microfluidic sieve, generally indicated at reference character 10 (in FIG. 1D) using a CVD growth process. As shown in FIG. 1A, a channel 11 is first formed, e.g. by etching a groove, in a substrate made of silicon, fused silica or other patternable material. While a grooved channel configuration is shown having a floor surface and opposing vertical sidewall surfaces, it is appreciated that the channel and its cross-section may be configured with any suitable geometry, such as the curved cross-section shown in FIG. 7. Next a layer of iron catalyst 12 is deposited in the channel 11. The layer of iron catalyst is preferably a thin film layer having a thickness of about 5 nanometers, and deposited using thin film deposition techniques, such as evaporation or sputtering, with lithographic masking. It is appreciated, that as an alternative to an iron layer, colloidal iron nanoparticles and iron nanoparticles supported on the fumed alumina surface may be utilized to grow carbon nanotubes as well.

Figure 1B:
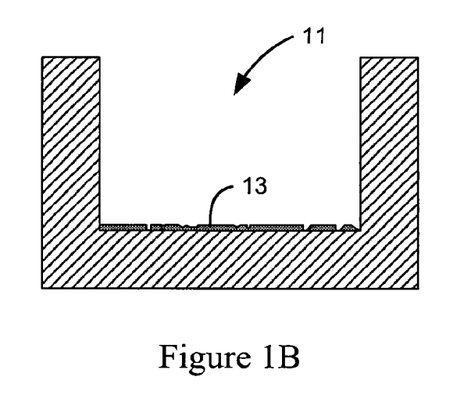
FIG. 1B is a schematic cross-sectional view following FIG. 1A, illustrating an oxidation stage of fabrication.

FIG. 1B shows the deposited layer of FIG. 1A then converted into iron oxide 13 by heating the substrate in an oxygen furnace, such as at 300 degrees Celsius for about 5 hours. The iron oxide is then reduced back into metallic iron by heating it in the hydrogen-rich atmosphere.

Figure 1C:
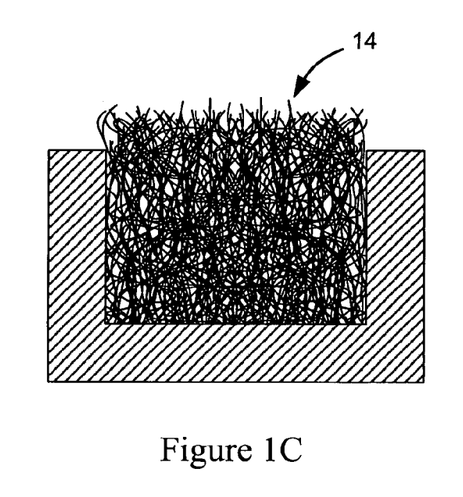
FIG. 1C is a schematic cross-sectional view following FIG. 1B, illustrating a carbon nanotube growth stage of fabrication.

As shown in FIG. 1C, carbon nanotubes are then grown in the channel to produce an intertwined free-standing carbon nanotube mesh 14. The mesh is produced by passing products of hydrocarbon pyrolysis over the catalyst surface at elevated temperatures, e.g. above 800 degrees Celsius. Structural mesh parameters of height, density, and pore size are regulated mostly by the density and size parameters of the nanotubes. Both of these parameters are controllable by changing gas flows, flow ratios, and catalyst thickness. The grown carbon nanotube mesh 14 has pores of variable and tunable size on the order of 10-200 nanometers. The resulting mesh is stable in a variety of organic solvents and in air due to the nanotubes being chemically inert, and resists ultrasonication very well. Furthermore, carbon nanotube elements possess unique mechanical strength and elasticity which makes the mesh highly robust.

Figure 5:
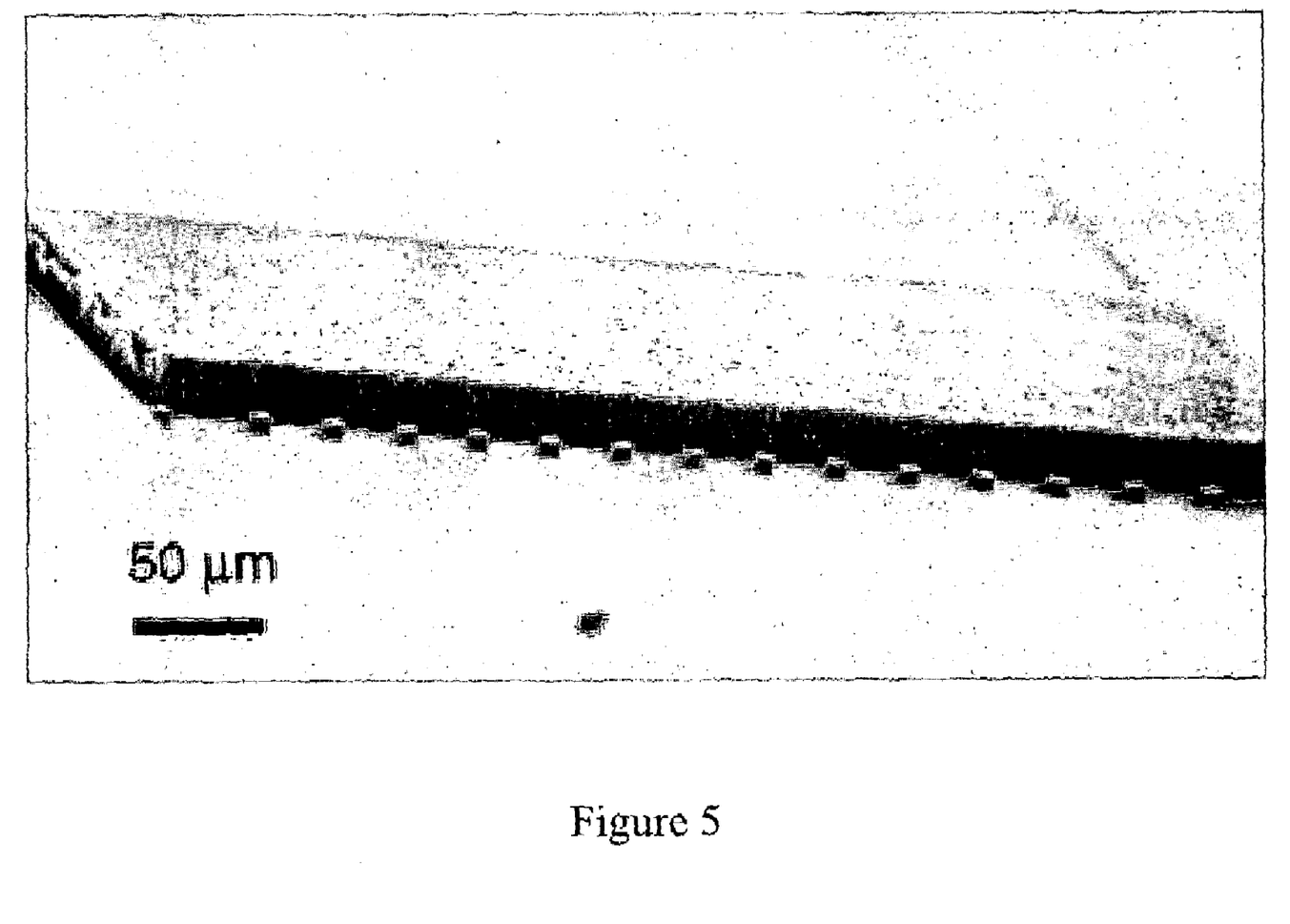
FIG. 5 is an image of a carbon nanotube mesh grown inside a microfabricated channel, and shown without a channel cover.
Figure 6:
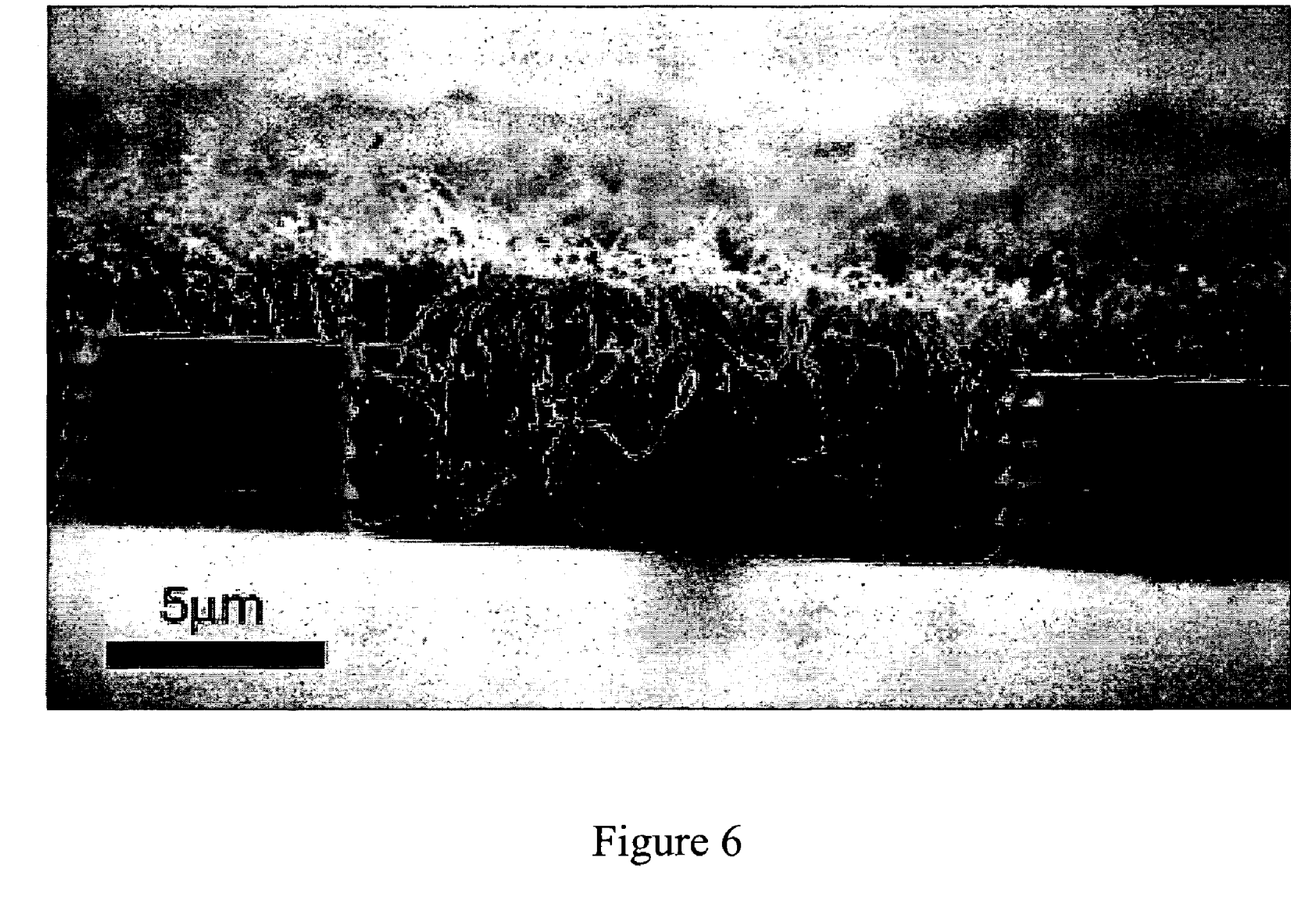
FIG. 6 is a magnified image of a carbon nanotube mesh grown according to the method of the present invention.
Figure 7:
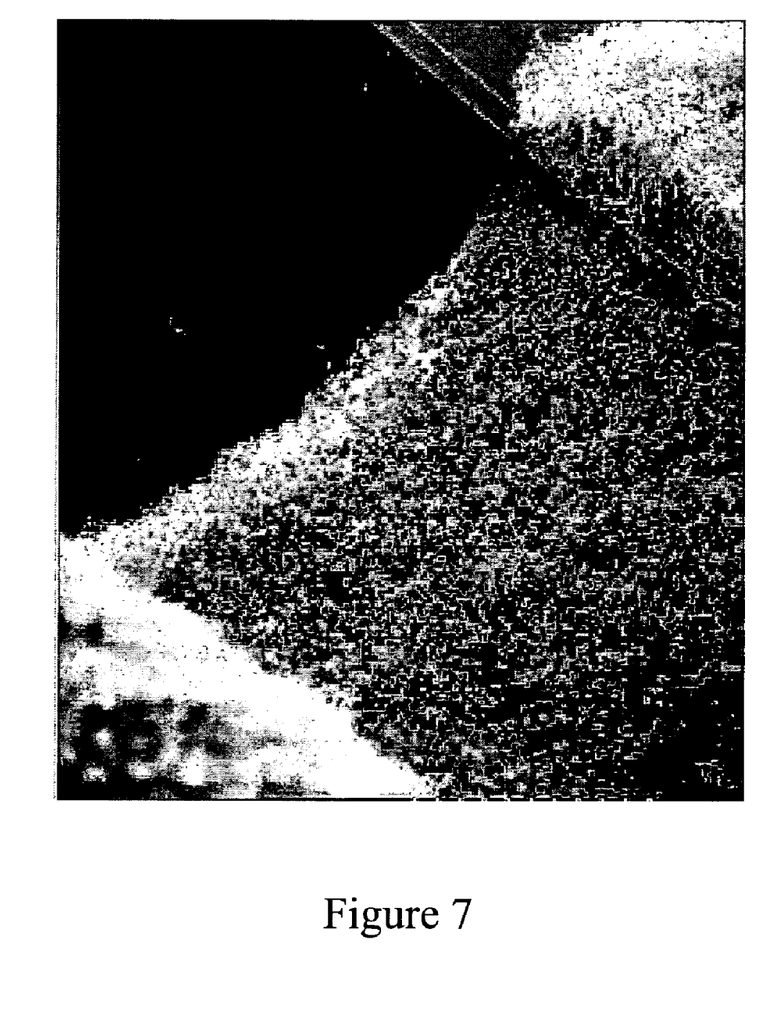
FIG. 7 is a magnified image of a microfluidic channel with a curved cross-section and a carbon nanotube mesh growth therein.

It is notable that because the carbon nanotubes consist of a mesh of the carbon nanotubes grown directly from solid or porous support of the channel surface, they are free-standing features supported by the channel. Moreover, the nanotubes extend randomly from this support into free space, e.g. the channel volume, characteristic of a free-grown structure to form a dense intertwined and entangled mesh as shown in FIGS. 5-7. Carbon nanotube meshes can be grown in this fashion over extended macroscopic surfaces, on lithographically defined microscale areas and inside microfabricated structures, such as the microfluidic channel 14. Moreover, the carbon nanotubes produced in this manner conforms to the shape of the microfluidic channel as shown in the figures. Since Fe catalyst can be easily patterned using standard lithographic techniques, nanotube meshs are easily patternable for applications that require miniaturization and integration of devices, such as for specific parts of a microfabricated device. Carbon nanotube meshes may be tuned to a particular application since it is possible to control nanotube size, density and orientation in the growth process.

Figure 8:
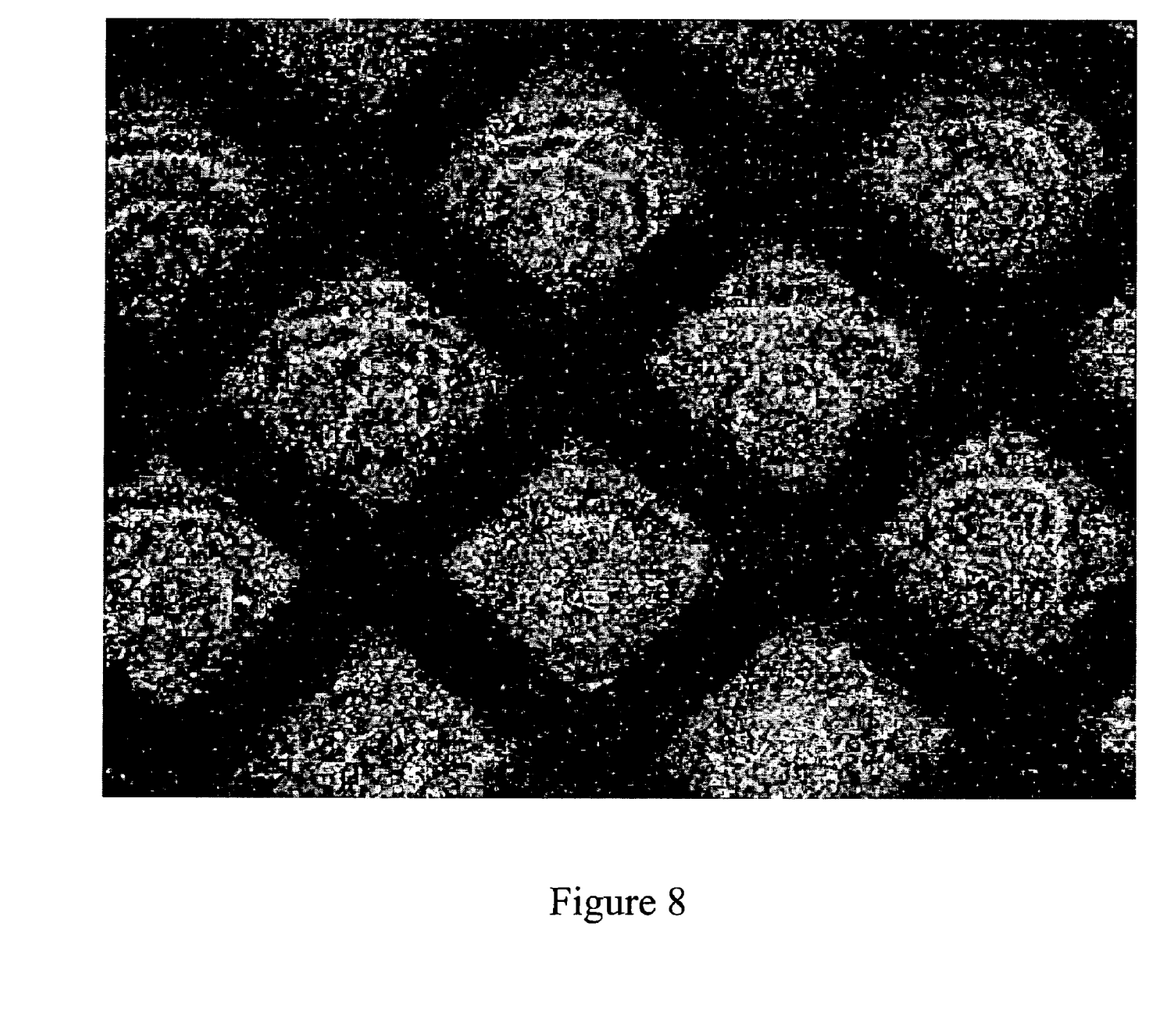
FIG. 8 is a magnified image of a carbon nanotube mesh having fluorescent beads adsorbed thereon as a result of surface functionalization.

Additionally, the carbon nanotube mesh of the present invention may be further customized by functionalizing the surface properties of the nanotubes to select and/or discriminate molecules. Surface functionalization may be achieved, for example, by applying different nanotube coatings and derivatizations of specific chemical groups. The coatings may be polymers or small molecules that either incorporate particular chemical functionality or facilitate the chemical attachment of a functionality. FIG. 8 shows a magnified view of a functionalized carbon nanotube mesh of the present invention with having fluorescent beads adsorbed thereon as a result of surface functionalization.

Figure 1D:
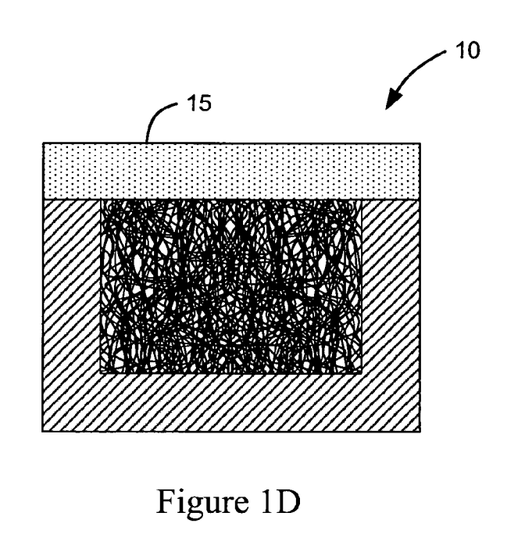
FIG. 1D is a schematic cross-sectional view following FIG. 1C, illustrating a capping stage of fabrication and the completed structure with a carbon nanotube mesh completely filling the channel.

FIG. 1D follows from FIG. 1C to show sealing of the channel with a cover 15 to enclose the nanotubes therein. In particular, and after the mesh is grown, the channel is enclosed by bonding the cover 15 to the substrate containing the mesh and capping the channel. The bonding procedure typically uses anodic bonding of a Pyrex cover slip to the top surface of the substrate, or fusion bonding of fused silica. Because of the nanotubes, this is typically performed under vacuum or in an inert atmosphere. As can be seen from FIGS. 1C and 1D, the cover 15 is utilized to pack the outgrowth of the mesh from the channel. This is made possible by growing the nanotubes a bit higher than the channel wall size, as shown in FIG. 1C, and then we packing the mesh as the channel is sealed. In this manner, a good contact may be formed without producing a gap between the mesh and the cover.

Figure 2:
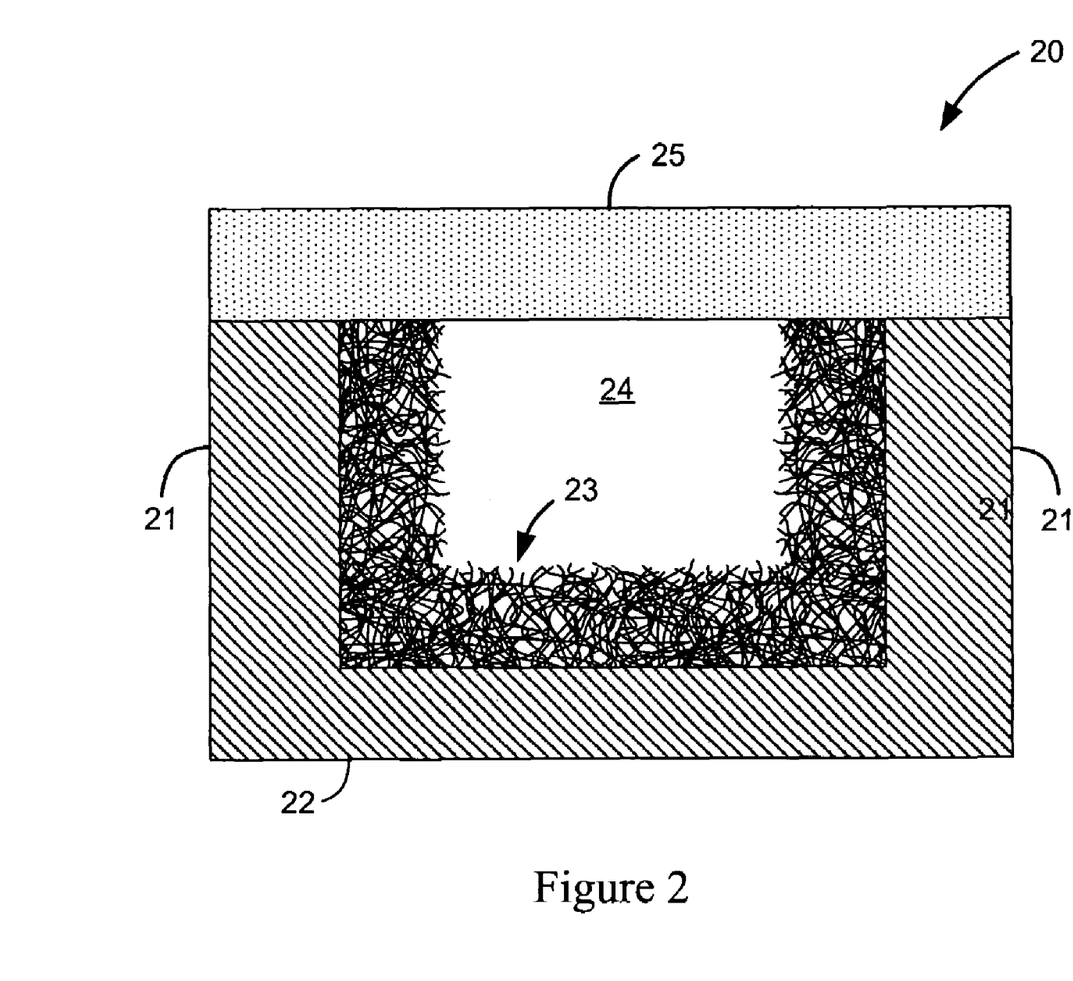
FIG. 2 is a schematic cross-sectional view of a second exemplary embodiment of the present invention, having a carbon nanotube mesh surface-coating the channel walls.

FIG. 2 shows a second embodiment of the microfluidic sieve, generally indicated at reference character 20, wherein the carbon nanotube mesh 23 is surface-coated along the channel without filling the cross-section of the channel. In particular, the mesh 23 is surface coated along all sides of the channel, including the channel sidewalls 21 and the channel floor 22. In this manner, a gap 24 is formed through the mesh 23 and the channel, whereby flow may continue for certain applications, while target molecules or analytes are separated, concentrated and/or filtered in the mesh 23. The cover 25 is shown without the mesh surface-coated thereon, because, as previously discussed, the cover is typically bonded subsequent mesh growth within the channel. However, in this embodiment as well, the cover 25 may serve to pack any outgrowth of nanotubes along the top edge back within the channel.

Figure 3:
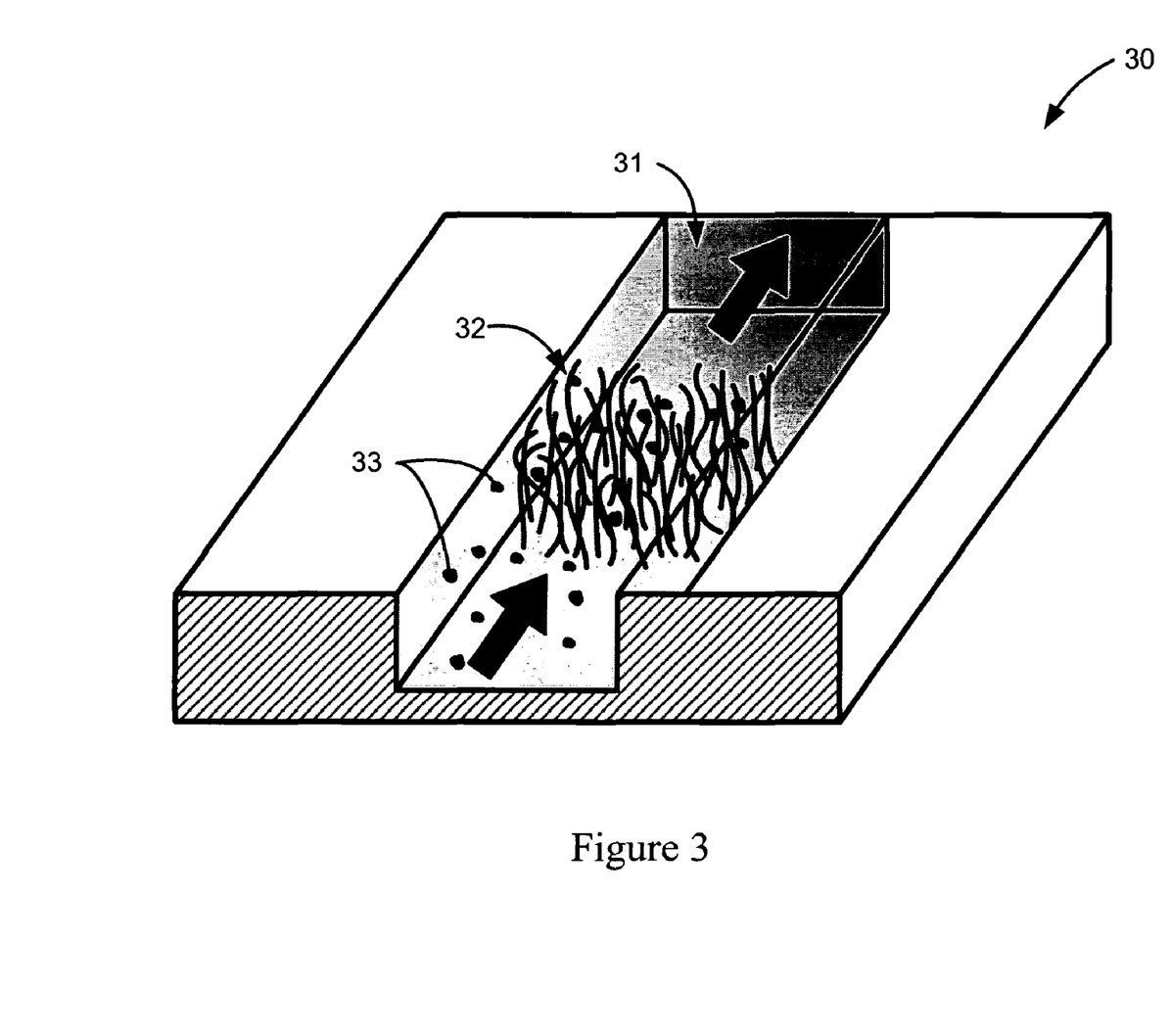
FIG. 3 is a schematic perspective view of an illustrative flow of molecules through the microfluidic sieve of the present invention.
Figure 4:
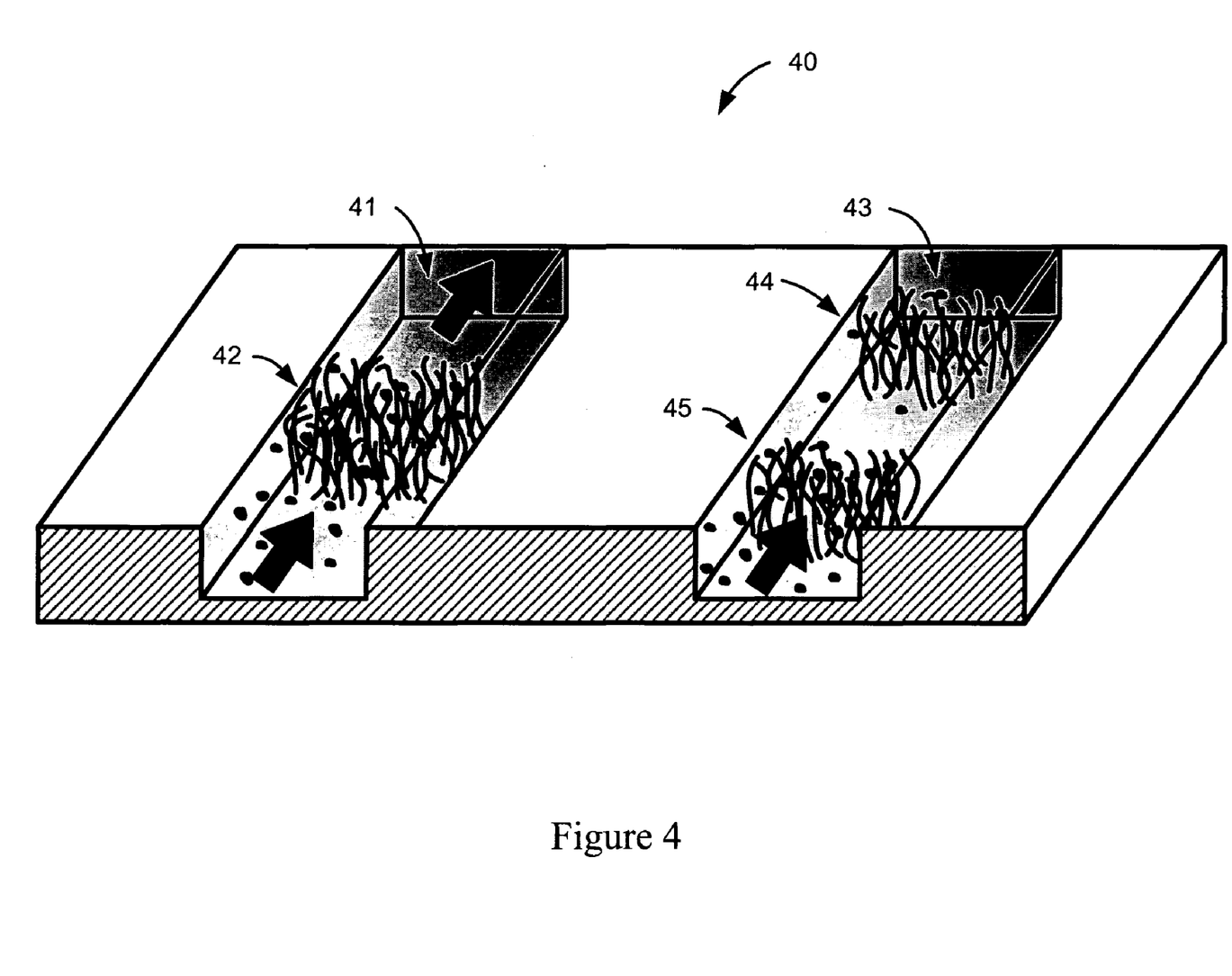
FIG. 4 is a schematic perspective view of an illustrative flow of molecules similar to FIG. 3 but shown with a microfluidic sieve having two microfluidic channels with varying mesh arrangements.

Operation and use of the microfluidic sieve is shown in FIGS. 3 and 4. FIG. 3 shows a single channel embodiment 30 having a single carbon nanotube mesh 32 therein, and FIG. 4 shows a double channel embodiment 40 having varying mesh arrangements. As shown in FIG. 3, the mesh 32 is grown and fixedly attached to at least a segment of the channel 31, where the segment may be the entire channel or a portion thereof. Arrows are shown indicating the flow direction of a fluid containing molecules 33. It is appreciated that the sieve may used for separating, concentrating, and/or filtering either gas mixtures or liquid solutions containing organic, inorganic, and biological species. In contrast to FIG. 3, the sieve 40 of FIG. 4 has a first channel 41 having a single mesh 42 fixedly attached therein, and a second channel 43 having a first mesh 44 fixedly attached to the channel, and a second mesh 45 also attached to the channel at an upstream location with respect to the first mesh 44. The first and second meshes are located at corresponding segments of the channel, wherein each segment is less than the entire length of the channel. With this arrangement, the meshes 44 and 45 may be configured, as discussed above, such that the sieve operates to optimally separate, concentrate, and/or filter molecules flowed therethrough.

As shown in FIG. 5, a securing nubbin, such as a lithographically formed post, may be positioned in the channel to prevent the dislocation of said carbon nanotube mesh, in the case where the mesh breaks away from its attachment to the channel. Preferably, the microfabricated post is positioned downstream of and adjacent to said carbon nanotube mesh.

While operation of the microfluidic sieve of the present invention may be intended for separation applications, such as electrophoretic separation, it is not limited only to such. The present invention may be utilized with pressure driven flow for other applications, such as, but not limited to: size exclusion chromatography (filtering); use as chromatography media (gas or liquid) by exploiting the different sticking probability of different chemical species to surfaces of bare nanotubes and modified nanotubes; and as concentrators for concentrating species by accumulating them either at the front boundary or just along the nanotube element, and subsequently releasing the collected species by changing environmental conditions to recover concentrated substrate. CNT as a patternable separation medium, therefore, may be utilized for various applications. Example applications, include but not limited to: gas chromatography, size exclusion liquid chromatography in a solvent that wets carbon nanotubes, filtering and concentration, possible HPLC-type separation or selective adsorption for molecules that have natural affinity to the aromatic graphite-like structure of nanotubes (dioxins are just one example). Furthermore, microfluidic sieves having a derivatized carbon nanotube mesh may be utilized, for example, for more targeted gas chromatography; size exclusion liquid chromatography in a water based solvent; filtering and concentration; separation of proteins (similar to RP HPLC); and DNA separations via electrophoresys.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

We claim:

1. A microfluidic sieve comprising:
a substrate having a microfluidic channel; and
a compressed carbon nanotube mesh comprising a plurality of intertwined free-standing carbon nanotubes fixedly attached within and randomly extending from the surface of said channel to form irregularly sized mesh pores between the intertwined nanotubes for separating, concentrating, and/or filtering molecules flowed therethrough; and
a cover layer sealably capping said microfluidic channel to thereby pack and compress the carbon nanotube mesh in the microfluidic channel,
wherein said mesh partially fills a cross-section of the channel to form a central gap therethrough.

2. The microfluidic sieve of claim 1,
wherein the surfaces of said carbon nanotubes are functionalized to chemically select/discriminate molecules.

3. The microfluidic sieve of claim 2,
wherein the surfaces of said carbon nanotubes are functionalized with a nanotube coating.

4. The microfluidic sieve of claim 3,
wherein the nanotube coating comprises a chemical derivatization.

5. The microfluidic sieve of claim 1,
wherein said carbon nanotube mesh has irregularly sized mesh pore sizes of 10 to 200 nanometers.

6. The microfluidic sieve of claim 1,
wherein said substrate is a patternable material with said microfluidic channel etched as a groove thereon.

7. The microfluidic sieve of claim 1,
wherein the cover layer is anodically bonded to said substrate.

8. The microfluidic sieve of claim 1,
wherein said substrate has at least one more of said microfluidic channel and a corresponding carbon nanotube mesh fixedly attached therein.

9. The microfluidic sieve of claim 1,
further comprising at least one securing nubbin positioned in said channel to prevent the dislocation of said carbon nanotube mesh.

10. The microfluidic sieve of claim 9,
wherein said securing nubbin(s) is a microfabricated post adjacently positioned downstream of said carbon nanotube mesh.

* * * * *